(12) United States Patent
Sasai (10) Patent No.: US 6,654,492 B1
(45) Date of Patent: Nov. 25, 2003

(54) IMAGE PROCESSING APPARATUS

(75) Inventor: Toshihiro Sasai, Kyoto (JP)

(73) Assignee: NuCORE Technology Inc., Santa Clara, CA (US)

( * ) Notice: Subject to any disclaimer, the term of this patent is extended or adjusted under 35 U.S.C. 154(b) by 659 days.

(21) Appl. No.: 09/639,512

(22) Filed: Aug. 14, 2000

(30) Foreign Application Priority Data

Aug. 20, 1999 (JP) .......................................... 11-233557

(51) Int. Cl.[7] .................................................. G06K 9/00
(52) U.S. Cl. ...................................................... 382/162
(58) Field of Search ................................. 382/162, 166, 382/299, 300; 348/262, 264, 265, 913; 375/240.2, 240.17

(56) References Cited

U.S. PATENT DOCUMENTS

| | | | | |
|---|---|---|---|---|
| 5,172,227 A | * | 12/1992 | Tsai et al. ................ | 375/240.2 |
| 5,574,572 A | | 11/1996 | Malinowski et al. ....... | 358/451 |
| 5,657,082 A | * | 8/1997 | Harada et al. .............. | 348/262 |
| 6,191,772 B1 | * | 2/2001 | Mical et al. ................ | 345/698 |
| 6,389,076 B2 | * | 5/2002 | Bakhmutsky et al. .. | 375/240.17 |

* cited by examiner

*Primary Examiner*—Jose L. Couso
(74) *Attorney, Agent, or Firm*—Townsend and Townsend and Crew LLP; Kenneth R. Allen (57) ABSTRACT

An image processing apparatus includes an interpolation unit, compensation value calculation unit, and compensation unit. For an interpolation point selected from an image signal at an interval of n pixels (n is an integer of 2 or more), the interpolation unit interpolates the pixel value of each color data at the interpolation point using the pixel values of pixels of the same color falling within an interpolation region of m×m pixels (m is an integer of 2 or more) centered on the interpolation point, and outputs the pixel value as an interpolated pixel value at the interpolation point for each color data. The compensation value calculation unit generates a pixel compensation value for compensating for the pixel value of the interpolation point using the pixel values of pixels falling within a compensation region of M×M pixels (M is an integer equal to or larger than m and n) centered on the interpolation point. The compensation unit compensates for the interpolated pixel value of each color data at the interpolation point that is output from the interpolation unit by using the pixel compensation value corresponding to the interpolation point that is obtained by the compensation value calculation unit, and outputs the compensated pixel value as a new pixel value of each color data at the interpolation point.

8 Claims, 10 Drawing Sheets

$$G_{33} = \frac{G_{32}+G_{23}+G_{43}+G_{34}}{4}$$

$$R_{33} = R_{33}$$

$$B_{33} = \frac{B_{22}+B_{42}+B_{24}+B_{44}}{4}$$

$$HF_{33} = \frac{2\times(G_{32}+G_{23}+G_{43}+G_{34}) - (G_{21}+G_{41}+G_{12}+G_{52}+G_{14}+G_{54}+G_{25}+G_{45})}{gf}$$

$$G_{43} = G_{43}$$
$$R_{43} = \frac{R_{33} + R_{53}}{2}$$
$$B_{43} = \frac{B_{42} + B_{44}}{2}$$

$$HF_{43} = \frac{2 \times (G_{32} + G_{52} + G_{34} + G_{54}) - (G_{21} + G_{41} + G_{61} + G_{23} + G_{63} + G_{25} + G_{45} + G_{65})}{gf}$$

FIG.5A    FIG.5B $$Ga = \frac{G_{32}+G_{43}}{2}$$

$$Ra = \frac{5 \times R_{33}+R_{31}+R_{51}+R_{53}}{8}$$

$$Ba = \frac{5 \times B_{42}+B_{22}+B_{24}+B_{44}}{8}$$

$$HFa = \frac{4 \times (G_{32}+G_{43}) - 2 \times (G_{21}+G_{54}) - (G_{41}+G_{52}+G_{23}+G_{34})}{gf}$$

$$G'a = Ga + HFa$$

$$R'a = Ra + HFa$$

$$B'a = Ba + HFa$$

IMAGE PROCESSING APPARATUS

BACKGROUND OF THE INVENTION

The present invention relates to an image processing apparatus and, more particularly, to an image processing apparatus for generating a high-quality image from a two-dimensional color image signal sensed by such as a single-CCD color electronic camera device.

Generally in an electronic image sensing apparatus for sensing an image using an image sensor such as a single multi-color filtered CCD, an image having all color data (RGB or a luminance value and color difference signals) for each pixel is generated by interpolation processing of a pixel value for an image made up of many pixels arrayed in a matrix on a two-dimensional plane, each of which has the pixel value of only one of a plurality of colors (primary colors).

To display an image sensed by the image sensor on a display device smaller in the number of pixels than the image, the original image must be downsized. In this case, if pixels forming the original image are simply thinned out, data of the original image is omitted, so-called aliasing noise is generated, and resultant images are jaggy. Hence, to downsize an image, the original image must be sampled at an interval larger than the pixel interval of the original image after the high-frequency component of the original image is attenuated by a low-pass filter.

For this image reduction processing, an analog or digital low-pass filter and a re-sampling circuit may be conventionally arranged for each pixel line. In most cases, filter calculation processing (convolution calculation) is done after an intermediate image having all color data for each pixel of an original image is generated using a DSP (Digital Signal Processor).

As calculation processing of this type, low-pass filter processing is done for each pixel of an intermediate image in units of a plurality of pixels contained in a predetermined region called a sub-matrix, and the sub-matrix is shifted on the original image while a portion overlapping a previous sub-matrix is left slightly.

However, the conventional method must generate an intermediate image having all color data for each pixel of an original image before filter calculation processing. Even when a still image which need not be recorded is displayed, e.g., an image is displayed on the viewfinder of a digital still camera in order to determine the perspective, a large-size intermediate image having a large number of pixels is generated only to obtain a small-size image having a relatively small number of pixels for the viewfinder.

This prolongs the processing time, and an image cannot be obtained in real time. Determination of the perspective required to update and display an image relatively rapidly cannot be realized in practical use.

Since a larger number of calculation processes than the number of processes of obtaining a high-quality recording image must be performed at high speed, power consumption increases along with the processes. A device such as a digital still camera which operates with a battery cannot attain a sufficient operation time.

SUMMARY OF THE INVENTION

The present invention has been made to overcome the conventional drawbacks, and has as its object to provide an image processing apparatus capable of obtaining a high-quality, small-size image at high speed without requiring a large number of processes or high power consumption.

To achieve the above object, according to the present invention, there is provided an image processing apparatus for generating, from an image signal, a new image signal having pixel values of all color data for each interpolation point set on a two-dimensional plane 1/n (n is an integer of not less than 2) times the image signal, comprising an interpolation unit for interpolating a pixel value of each color data at an interpolation point using pixel values of pixels of the same color falling within an interpolation region of m×m pixels (m is an integer of not less than 2) centered on the interpolation point, for an interpolation point selected at an interval of n pixels in at least a pixel line direction or a pixel column direction from an original image signal which has only a pixel value of single predetermined color data and is obtained by an image sensing element made up of many pixels that are arrayed in a matrix on a two-dimensional plane and respectively have different color filters, and for outputting the pixel value as an interpolated pixel value at the interpolation point for each color data, a compensation value calculation unit for generating a pixel compensation value for compensating for the pixel value of the interpolation point using pixel values of a plurality of pixels falling within a compensation region of M×M pixels (M is an integer not less than m and n) centered on the interpolation point that is wider than and includes the interpolation region, and a compensation unit for compensating for the interpolated pixel value of each color data at the interpolation point that is output from the interpolation unit by using the pixel compensation value corresponding to the interpolation point that is obtained by the compensation value calculation unit, and outputting the compensated pixel value as a new pixel value of each color data at the interpolation point.

BRIEF DESCRIPTION OF THE DRAWINGS

FIGS. 8A to 8C are explanatory views showing the basic operation in the third embodiment;

DESCRIPTION OF THE PREFERRED EMBODIMENTS

The present invention will be described below with reference to the accompanying drawings.

Figure 1:
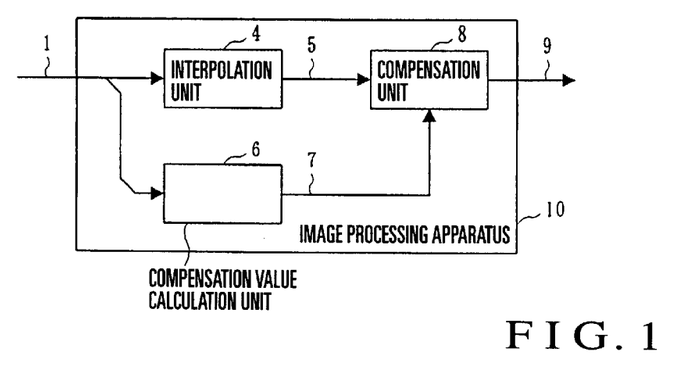
FIG. 1 is a block diagram showing an image processing apparatus according to an embodiment of the present invention.

FIG. 1 shows an image processing apparatus according to the first embodiment of the present invention.

In FIG. 1, an image processing apparatus 10 comprises an interpolation unit 4 for interpolating the pixel value of each color data at an interpolation point using the pixel values of neighboring pixels of the same color positioned within an interpolation region of m×m pixels (m is an integer of 2 or more) centered on the interpolation point, with respect to an interpolation point selected from a two-dimensional plane constituted by an input image signal 1 at an interval of n pixels (n is an integer of 2 or more) in at least the pixel line direction or pixel column direction, and for outputting the interpolated value as an interpolated pixel value 5 at the interpolation point for each color data.

The image processing apparatus 10 further comprises a compensation value calculation unit 6 for generating a pixel compensation value 7 for compensating for the pixel value of the interpolation point using the pixel values of a plurality of pixels around the interpolation point that fall within a compensation region of M×M pixels (M is an integer larger than n and m) wider than and including the interpolation region used by the interpolation unit 4, and a compensation unit 8 for compensating for the interpolated pixel value 5 of each color data at the interpolation point that is output from the interpolation unit 4 by using the pixel compensation value 7 obtained by the compensation value calculation unit 6, and for outputting the compensated value as a new pixel value 9 of each color data at the interpolation point.

In the following description, the image signal 1 is an image signal output from an image sensing element such as a multi-color filtered CCD, i.e., an image signal having a so-called Bayer array in which R, G, and B pixels are arrayed in an almost checkered pattern. However, the image signal 1 is not limited to this. In addition, the present invention can be applied not only to a case wherein an image is reduced by 1/n from a two-dimensional plane formed from the input image signal 1 in either the pixel line direction or pixel column direction, but also to a case wherein an image is reduced by 1/n in both the pixel line direction and pixel column direction.

Figure 2A:
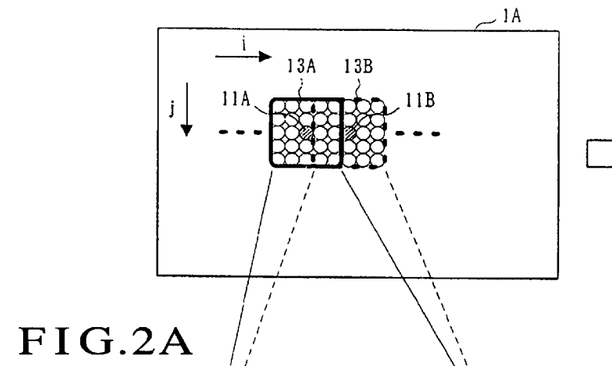
FIGS. 2A to 2C are explanatory views showing the basic operation in the first embodiment.
Figure 2B:
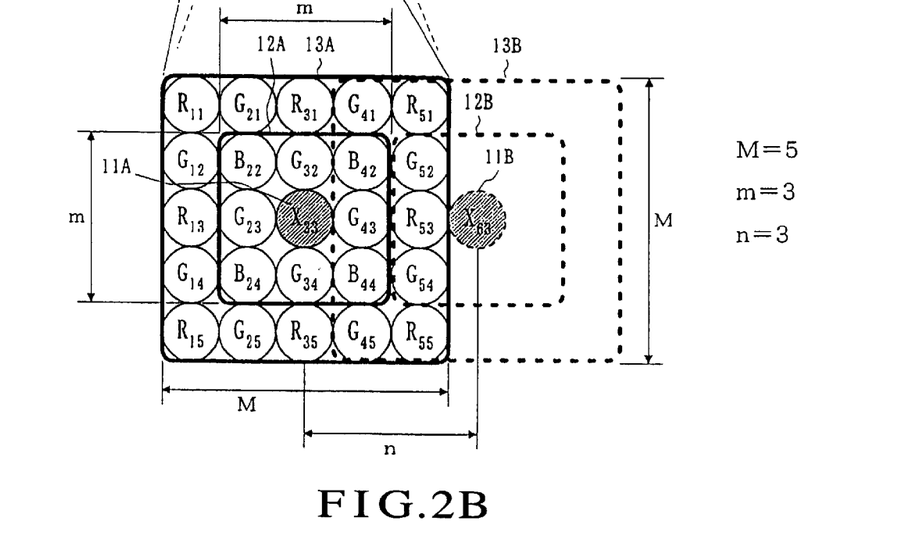
Figure 2C:
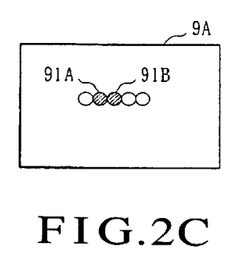

The basic operation in the first embodiment of the present invention will be described with reference to FIGS. 2A to 2C. FIG. 2A shows the two-dimensional plane image of an image signal, FIG. 2B shows a setting example of each region, and FIG. 2C shows the two-dimensional plane image of a desired image signal. In this case, a two-dimensional plane image 1A formed from the input image signal 1 is downsized to ⅓ (n=3) in the pixel line direction to obtain a two-dimensional plane image 9A formed from the new image signal 9. This also applies to a case wherein an image is downsized in only the pixel column direction and a case wherein an image is downsized in both the pixel line direction and pixel column direction.

In FIGS. 2A to 2C, the size m of the interpolation region is m=3, and the size M of the compensation region is M=5. In this case, interpolation points 11A, 11B, . . . are selected from the two-dimensional plane image 1A at an interval of 3 (n=3) pixels in a pixel line direction i and pixel column direction j, and serve as pixels 91A, 91B, . . . forming a desired two-dimensional plane image 9A.

In FIG. 2B, reference numeral 12A denotes an interpolation region of 3×3 pixels (m=3) centered on the interpolation point 11A. The interpolation unit 4 calculates the interpolated pixel value 5 at the interpolation point 11A using the pixel values of pixels contained in the interpolation region 12A. Reference numeral 13A denotes a compensation region of 5×5 pixels (M=5) centered on the interpolation point 11A. The compensation value calculation unit 6 calculates the pixel compensation value 7 at the interpolation point 11A using the pixel values of pixels contained in the compensation region 13A.

Figure 3A:
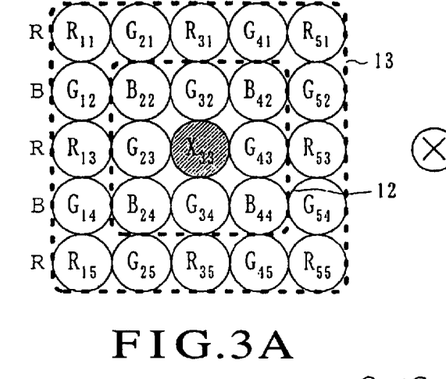
FIGS. 3A to 3C are explanatory views showing image processing operation (the interpolation point is set at an R pixel) according to the first embodiment.
Figure 3B:
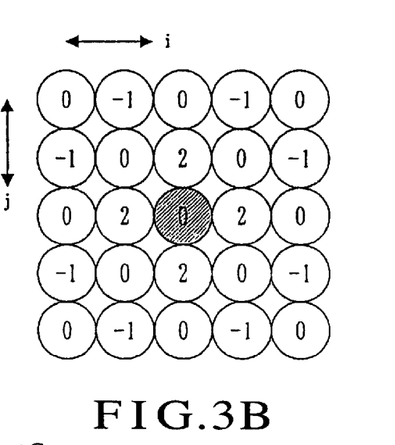
Figure 3C:
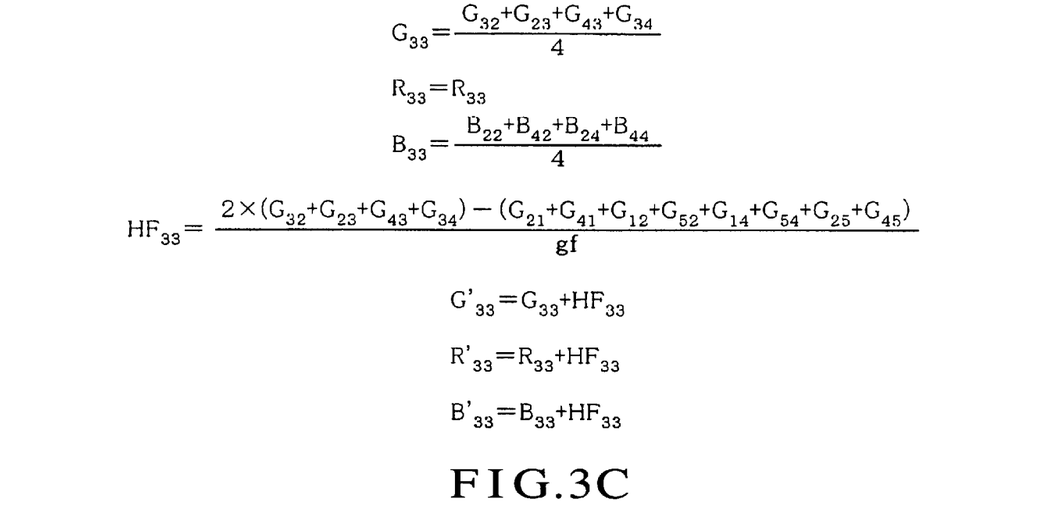
Figure 4A:
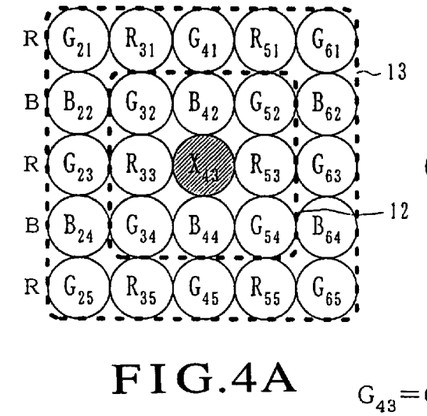
FIGS. 4A to 4C are explanatory views showing image processing operation (the interpolation point is set at a G pixel on an R pixel line) according to the first embodiment.
Figure 4B:
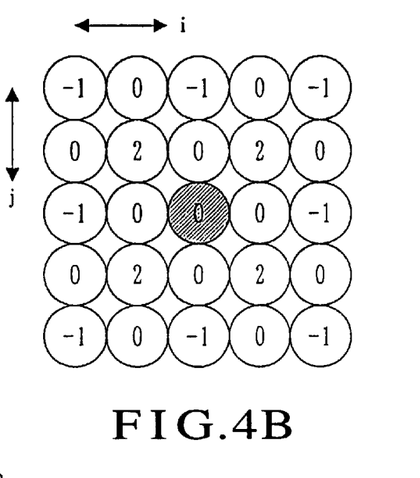
Figure 4C:
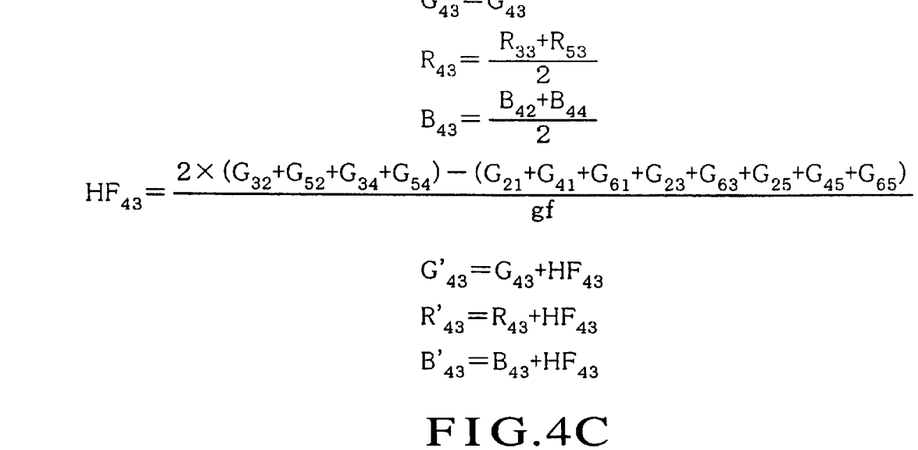

Details of image processing operation according to the first embodiment of the present invention will be explained with reference to FIGS. 3A to 3C and 4A to 4C. FIGS. 3A to 3C show a case wherein the interpolation point is set at an R pixel, and FIGS. 4A to 4C show a case wherein the interpolation point is set at a G pixel on an R pixel line.

Processing operation when the interpolation point is set at an R pixel will be explained with reference to FIGS. 3A to 3C. FIG. 3A shows a pixel array example, FIG. 3B shows filter coefficients for calculating a compensation value, and FIG. 3C shows equations representing interpolation processing, compensation value calculation processing, and compensation processing.

The interpolation unit 4 calculates the interpolated pixel values 5 ($G_{33}$, $R_{33}$, and $B_{33}$) at an interpolation point ($X_{33}$) set as the center by using the pixel values of predetermined pixels adjacent to the interpolation point $X_{33}$ among the pixels of the input image signal 1, as shown in FIG. 3A. Each interpolated pixel value 5 is calculated by the equation shown in FIG. 3C using the pixel values of peripheral pixels of the same color falling within an interpolation region 12 of 3×3 pixels which surrounds the interpolation point $X_{33}$, i.e., is centered on the interpolation point $X_{33}$.

At the same time, the compensation value calculation unit 6 generates the pixel compensation value 7 ($HF_{33}$) for compensating for the pixel value of each color data at the interpolation point by the equation shown in FIG. 3C using the pixel values of predetermined pixels around the interpolation point $X_{33}$ used by the interpolation unit 4, the filter coefficients shown in FIG. 3B, and a compensation scale factor (weighting factor) gf. Calculation of the pixel compensation value 7 uses predetermined pixels falling within a range, e.g., compensation region 13 of 5×5 pixels corresponding to the filter coefficients, that is wider than the interpolation region used for interpolation processing of the interpolation unit 4, and includes the interpolation region.

The interpolated pixel value 5 calculated by the interpolation unit 4 does not contain any high spatial frequency component in the pixel region centered on the interpolation point. To the contrary, the pixel compensation value 7 contains a high spatial frequency component in the pixel region. As given by the equations of FIG. 3C, the compensation unit 8 adds (or integrates) the pixel compensation value 7 to the interpolated pixel values 5, compensates for the interpolated pixel values 5 of respective color data, and calculates new pixel values 9 ($G'_{33}$, $R'_{33}$, and $B'_{33}$) of the respective color data at the interpolation point ($X_{33}$).

Processing operation when the interpolation point is set at a G pixel on an R pixel line will be explained with reference to FIGS. 4A to 4C. FIG. 4A shows a pixel array example, FIG. 4B shows filter coefficients for calculating a compensation value, and FIG. 4C shows equations representing interpolation processing, compensation value calculation processing, and compensation processing. In processing operation when the interpolation point is set at a G pixel on an R pixel line, the interpolation point is shifted by one pixel in the pixel line direction, compared to processing operation when the interpolation point is set at an R pixel, as shown in FIGS. 3A to 3C.

Hence, the processing operations of the interpolation unit 4, compensation value calculation unit 6, and compensation unit 8 are almost the same as those in FIGS. 3A to 3C. However, since an interpolation point ($X_{34}$) is originally a G pixel, the equations for calculating the interpolated pixel values 5 by the interpolation unit 4 and the equation for calculating the pixel compensation value 7 by the compensation value calculation unit 6 change as shown in FIG. 4C.

As described above, according to the present invention, each interpolation point 11A is selected from the two-dimensional plane image 1A at an interval of n pixels in the pixel line direction i and pixel column direction j. The interpolation unit 4 calculates each interpolated pixel value 5 at the interpolation point 11A from the pixel values of pixels of the same color falling within the interpolation region 12A centered on the interpolation point 11A. The compensation value calculation unit 6 calculates the pixel compensation value 7 at the interpolation point 11A from the pixel values of a plurality of pixels falling within the compensation region 13A wider than and including the interpolation region 12A used by the interpolation unit 4. The compensation unit 8 compensates for each interpolated pixel value 5 using the pixel compensation value 7.

A value which is omitted by interpolation using the interpolation region 12A in the interpolation unit 4 is compensated by the pixel compensation value 7 calculated from the compensation region 13A wider than and including the interpolation region 12A, thereby obtaining a new pixel value containing the high spatial frequency component. Thus, interpolation processing using the pixels of the interpolation region and filter calculation processing for suppressing degradation of image quality caused by downsizing of an image can be executed at once.

Unlike the prior art, an intermediate image having all color data for each pixel of an original image need not be generated. A downsized image having all color data for each pixel can be attained with high image quality without performing a large number of processes. In displaying an image on the viewfinder of a digital still camera in order to determine the perspective, a high-quality image can be displayed at high speed without requiring high power consumption.

The compensation value calculation unit 6 calculates the pixel compensation value 7 using only the pixel values of a plurality of pixels having color data which represents the luminance component of an image signal, e.g., using only the pixel values of G pixels for an image signal having a Bayer array, as shown in FIGS. 3A to 3C and 4A to 4C. Thus, the compensation unit 8 can compensate for only luminance components for the pixel values of pixels of each color data without changing color balance. In general, a pixel which represents a luminance component is the largest in number and has the highest frequency component, so that a new pixel value containing a higher frequency component can be obtained, compared to a pixel value interpolated by only pixels of the same color.

The second embodiment of the present invention will be described with reference to FIGS. 5A to 5C.

Figure 5A:
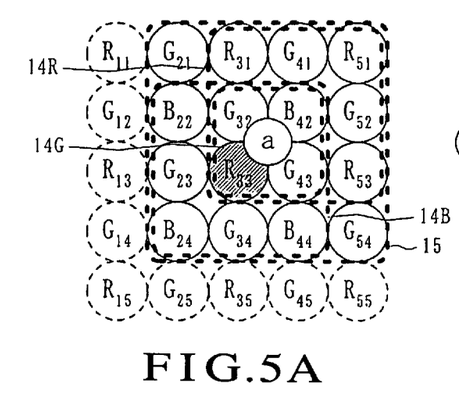
FIGS. 5A to 5C are explanatory views showing image processing operation according to the second embodiment.
Figure 5B:
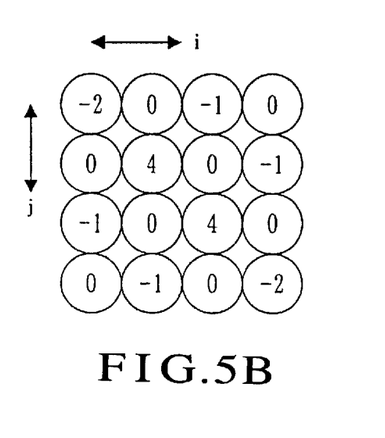
Figure 5C:
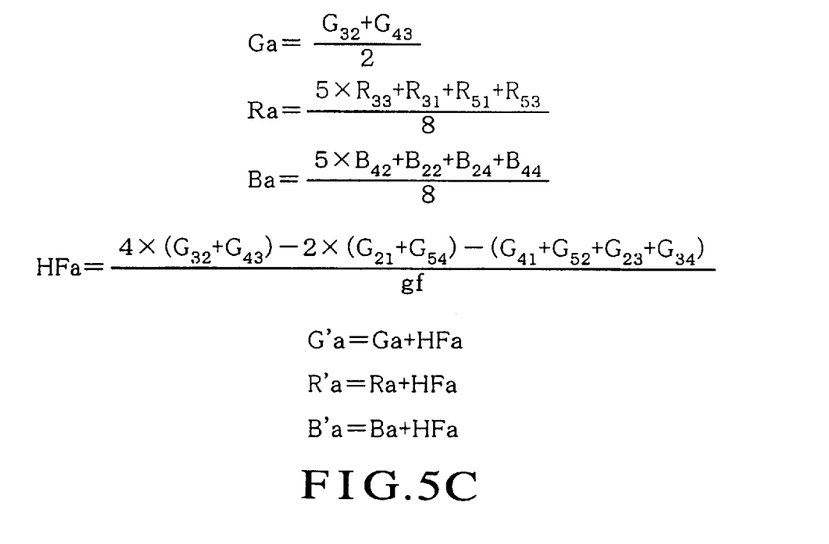

FIG. 5A shows a pixel array example, FIG. 5B shows filter coefficients for calculating a compensation value, and FIG. 5C shows equations representing interpolation processing, compensation value calculation processing, and compensation processing. In the first embodiment, the interpolation point is set at a pixel. However, the interpolation point is not limited to the same position as a pixel, and may be set at a position shifted from a pixel position, i.e., between pixels.

In the second embodiment, an interpolation point a is set between pixels.

In FIG. 5A, the interpolation point a is set at a position shifted from the R pixel $R_{33}$ serving as the interpolation point $X_{33}$ in FIG. 3A to an upper right position and surrounded by four, R pixel $R_{33}$, G pixel $G_{32}$, G pixel $G_{43}$, and B pixel $B_{42}$. In this case, an interpolation unit 4 calculates, based on the equation shown in FIG. 5C, each interpolated pixel value 5 (Ga, Ra, or Ba) from peripheral pixels of the same color included in an interpolation region 14G of 2×2 pixels (m=2) or an interpolation region 14R or 14B of 3×3 pixels (m=3) including the interpolation point a.

At the same time, a compensation value calculation unit 6 generates a pixel compensation value 7 (HFa) for compensating for the pixel value of each color data at the interpolation point a by the equation shown in FIG. 5C using the pixel values of a plurality of pixels around the interpolation point a that fall within a range wider than and including the interpolation region used by the interpolation unit 4, the filter coefficients shown in FIG. 5B, and a compensation scale factor (weighting factor) gf. Calculation of the pixel compensation value 7 uses predetermined pixels falling within a range which is centered on the interpolation point a and is wider than the region used by the interpolation unit 4 for interpolating each color value, e.g., compensation region 15 of 4×4 pixels (M=4) corresponding to the filter coefficients.

The interpolated pixel value 5 calculated by the interpolation unit 4 does not contain any high spatial frequency component in the pixel region centered on the interpolation point. To the contrary, the pixel compensation value 7 contains a high spatial frequency component corresponding to the pixel region and coefficients. As given by the equations of FIG. 5C, a compensation unit 8 adds (or integrates) the pixel compensation value 7 to the interpolated pixel values 5, compensates for the interpolated pixel values 5 of the respective color data, and calculates new pixel values 9 (G'a, R'a, and B'a) of the respective color data at the interpolation point a.

Figure 6A:
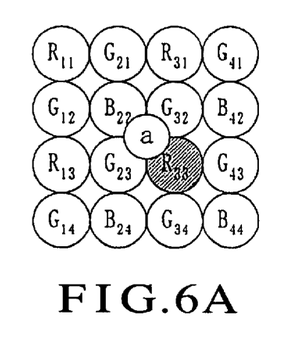
FIGS. 6A to 6C are explanatory views each showing the setting position of the interpolation point.
Figure 6B:
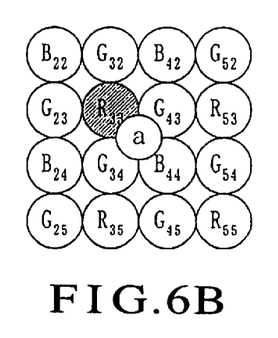
Figure 6C:
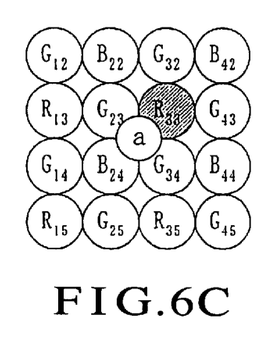

FIGS. 6A to 6C show the setting position of the interpolation point. In FIGS. 5A to 5C, the interpolation point a is set at the upper right of the R pixel $R_{33}$. The setting position of the interpolation point a may be set at the upper left, lower right, or lower left of the R pixel $R_{33}$, as shown in FIGS. 6A to 6C. In FIG. 6A, the pixel array example in FIG. 5A is horizontally reversed (or rotated through 90°). In accordance with this, the filter coefficients in FIG. 5B are horizontally reversed (or rotated through 90°).

In FIGS. 6B and 6C, R and B pixels in FIGS. 5A and 6A are exchanged. The interpolated pixel values 5 are calculated by exchanging R and B. In any case, similar to the equations in FIG. 5C, the interpolated pixel values 5 are calculated from pixels falling within the interpolation region of 2×2 pixels or 3×3 pixels including the interpolation point a, and the pixel compensation value 7 is calculated from predetermined pixels falling within the compensation region of 4×4 pixels wider than the interpolation region.

In FIGS. 5A to 5C, the interpolation point is positioned at the upper right of an R pixel. A case wherein the interpolation point is positioned at the upper right of a G or B pixel corresponds to any one of the cases shown in FIGS. 5A and 6A to 6C. For example, when the interpolation point a is set at the upper right of a G pixel on an R pixel line, the positional relationship between the target pixel and the interpolation point coincides with that in FIG. 6A. Processes for all cases can therefore be executed with the four patterns shown in FIGS. 5A and 6A to 6C.

In this manner, even if the interpolation point is set at a position shifted from a pixel position, a new pixel value can be calculated similarly to the first embodiment, and a high-quality image having a high spatial frequency component can be attained by relatively simple processing. The pixel compensation value 7 is calculated using only the pixel values of a plurality of pixels having color data which represents the luminance component of an image signal, e.g., using only the pixel values of G pixels for an image signal having a Bayer array. For this reason, the compensation unit 8 can compensate for only luminance components for the pixel values of pixels of each color data without changing color balance.

When the number M of pixels on one side of a region is even, like a region of 4×4 pixels (M=4) used to calculate a compensation value, the spatial frequency characteristics of the pixel compensation value 7 change for each pixel. However, only the direction of the characteristics changes, and its response remains unchanged. A change in the characteristics of the pixel compensation value 7 caused by the position of the interpolation point is smaller than a case wherein the number M of pixels on one side is odd. Thus, a higher-quality image can be obtained.

The third embodiment of the present invention will be described with reference to FIG. 7.

Figure 7:
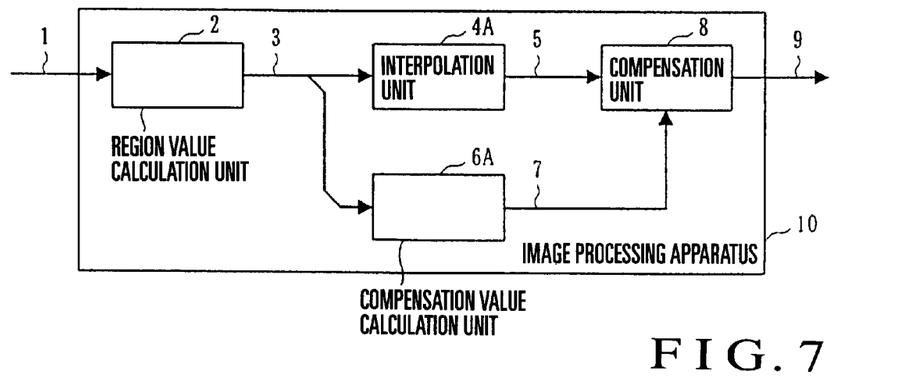
FIG. 7 is a block diagram showing an image processing apparatus according to the third embodiment.

FIG. 7 shows an image processing apparatus according to the third embodiment.

In FIG. 1, the interpolation unit 4 and compensation value calculation unit 6 directly receive the image signal 1. In the third embodiment, as shown in FIG. 7, a region value calculation unit 2 is adopted to receive and pre-process an image signal 1, and then the image signal 1 is distributed to an interpolation unit 4A and compensation value calculation unit 6A.

In FIG. 7, the region value calculation unit 2 receives the image signal 1, and outputs the sums of the pixel values of pixels belonging to respective pixel regions, as region values 3 for the respective pixel regions set in advance on a sub-matrix made up of pixels to be processed including the interpolation point as the center. The region values 3 calculated by the region value calculation unit 2 are parallel-output in synchronism with reception of a pixel block.

Processes executed in the interpolation unit 4A and compensation value calculation unit 6A are the same as in the interpolation unit 4 and compensation value calculation unit 6 in FIG. 1 except that the interpolation unit 4A and compensation value calculation unit 6A do not directly receive the image signal 1, but selectively use the region values 3 parallel-output from the region value calculation unit 2 to sequentially calculate and output interpolated pixel values 5 and a pixel compensation value 7 at the interpolation point on the corresponding sub-matrix.

Figure 8A:
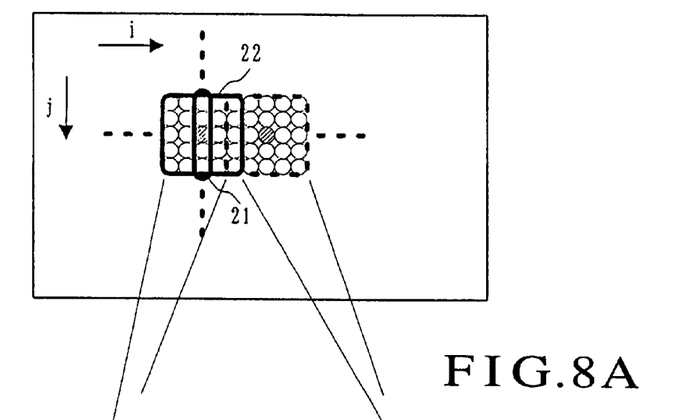
Figure 8B:
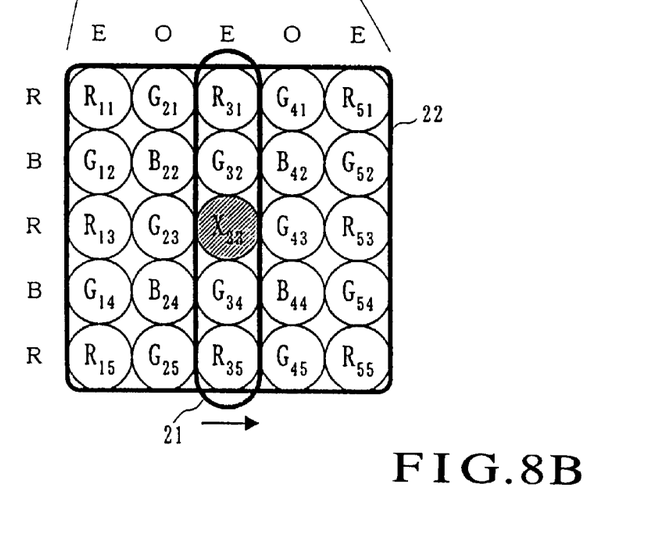
Figure 9A:
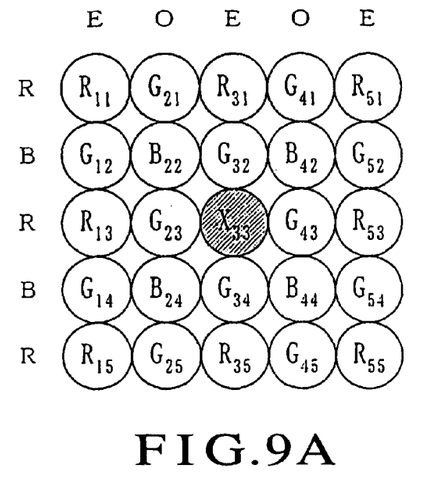
FIGS. 9A to 9C are explanatory views showing the operation of a region value calculation unit.
Figure 9B:
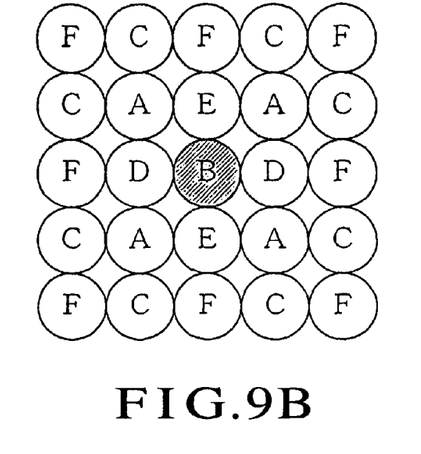
Figure 9C:
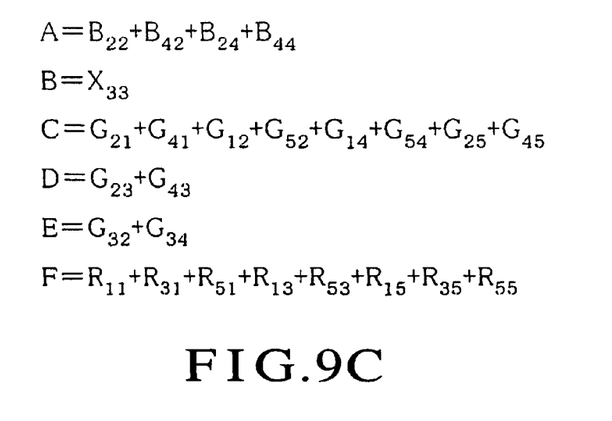

FIGS. 8A and 8B show the basic operation in the third embodiment. FIG. 8A shows the two-dimensional plane image of an image signal, and FIG. 8B shows a setting example of each region. FIGS. 9A to 9C show the operation of the region value calculation unit. FIG. 9A shows a compensation region, FIG. 9B shows regions set in the compensation region, and FIG. 9C shows equations for calculating region values.

As shown in FIG. 8A, the region value calculation unit 2 sequentially receives pixel values forming the image signal 1 by the number M of pixel lines (j direction), e.g., five pixel lines as the number of pixel lines necessary for calculating the pixel compensation value 7 in parallel with each other in units of single pixel columns as pixel blocks 21.

As shown in FIG. 8B, a sub-matrix 22 equal in size to the compensation region is formed from the pixel blocks 21 corresponding to five pixel columns as M successively received pixel columns (i direction), e.g., the number of pixel columns necessary for calculating the pixel compensation value 7. Then, the sub-matrix 22 shifts by one pixel in the i direction on the two-dimensional plane image.

For preset regions A to F shown in FIG. 9B on the sub-matrix 22 constituted in this way, the region value calculation unit 2 calculates the sums, i.e., region values 3 of the pixel values of pixels belonging the respective pixel regions on the basis of the equations in FIG. 9C. Then, the region value calculation unit 2 parallel-outputs the region values in synchronism with reception of the pixel block 21. The interpolation unit 4A and compensation value calculation unit 6A selectively use the parallel-output region values, and sequentially calculate and output interpolated pixel values and a pixel compensation value at the interpolation point on the corresponding sub-matrix.

These pixel regions are set based on equations used by the interpolation unit 4A and compensation value calculation unit 6A. FIG. 9B shows the pixel regions A to F when interpolation processing and pixel compensation value calculation processing in the first embodiment are employed. A case wherein the pixel regions A to F are set will be exemplified.

Figure 10:
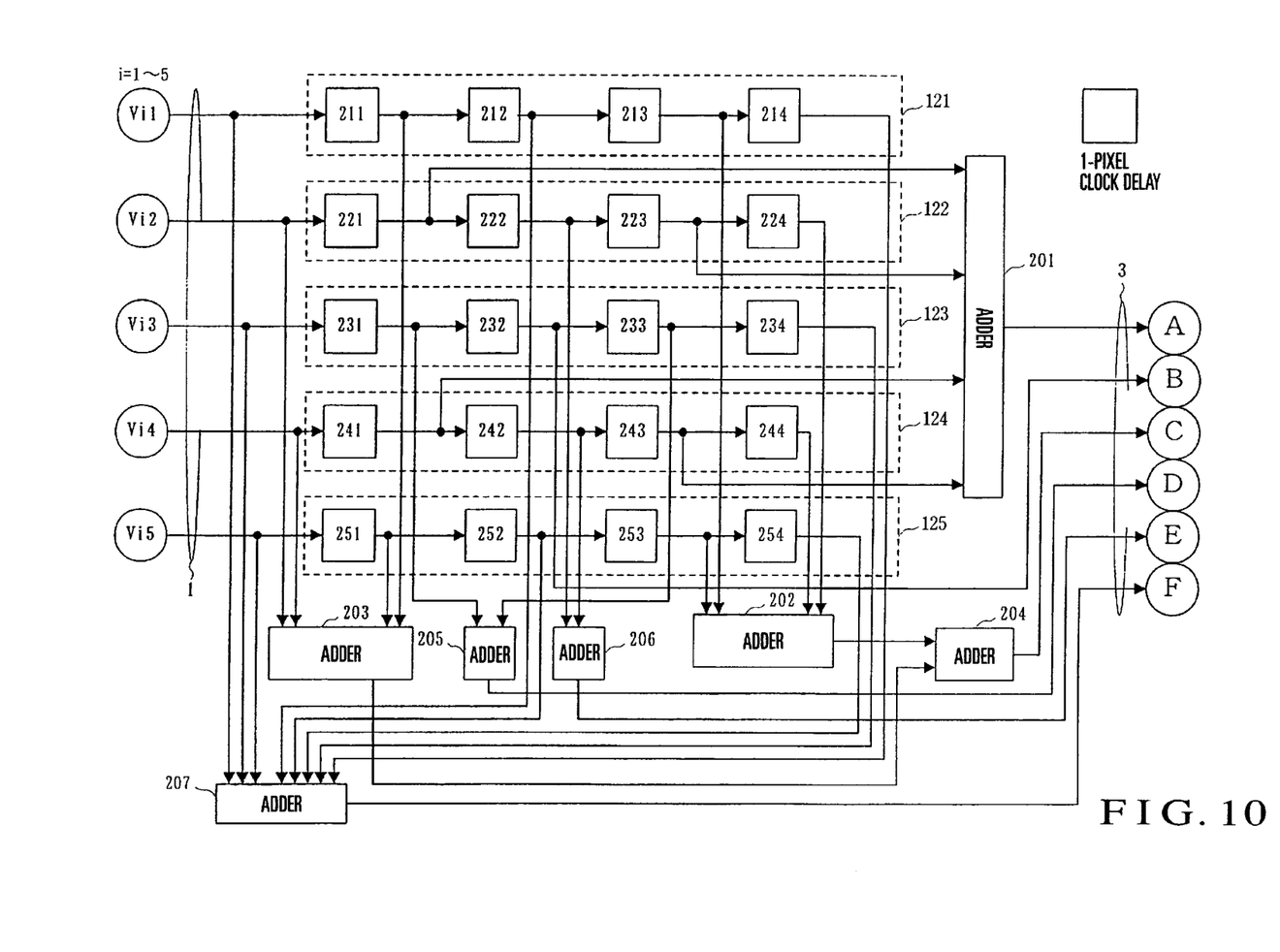
FIG. 10 is a block diagram showing an arrangement of the region value calculation unit.

FIG. 10 shows an arrangement of the region value calculation unit. In FIG. 10, reference numerals 121 to 125 denote shift registers each made up of four series-connected 1-pixel clock delays 211 to 214, 221 to 224, 231 to 234, 241 to 244, or 251 to 254. The shift registers 121 to 125 are arranged in parallel with each other for pixel values Vi1 to Vi5 of the pixel blocks 21. The "1-pixel clock delay" (to be referred to as a delay hereinafter) is a latch circuit for delaying and outputting an input pixel value in synchronism with a clock signal in the pixel line direction (i direction).

When five successive pixel blocks 21 are sequentially received, the delays of the shift registers 121 to 125 output pixel values at pixel positions on the sub-matrix 22. For the pixel regions, adders 201 to 207 add all pixels belonging to the respective pixel regions and outputs from corresponding delays, thereby obtaining respective region values.

For example, the adder 201 adds outputs from the delays 221, 223, 241, and 243 corresponding to the region A in FIG. 9C to obtain a region value A. The region value calculation unit 2 calculates the region values 3 from the received sub-matrix 22, and parallel-outputs them.

Figure 11:
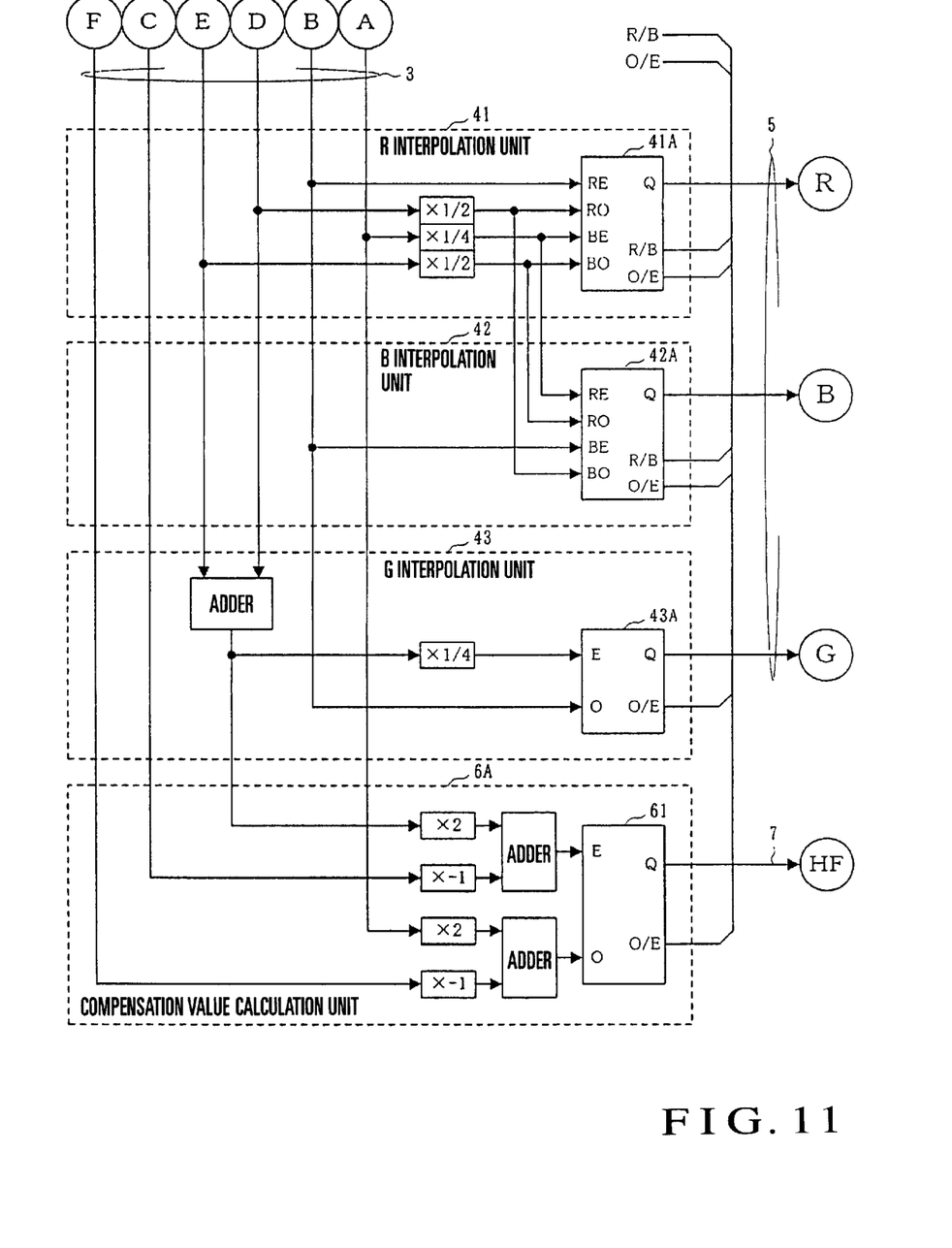
FIG. 11 is a block diagram showing an arrangement of an interpolation unit and compensation value calculation unit.

FIG. 11 shows an arrangement example of the interpolation unit and compensation value calculation unit. The interpolation unit 4A is constituted by R, B, and G interpolation units 41, 42, and 43 for performing interpolation processes concerning R, B, and G pixels, respectively. The interpolation units 41 to 43 parallel-calculate a plurality of interpolated pixel values corresponding to the position of the interpolation point using integrators (dividers) and adders.

Corresponding interpolated pixel values are selected by selectors 41A to 43A based on O/E and R/B signals or only the O/E signal representing the position of an actual interpolation point, and output as interpolated pixel values 5 (R, B, and G) at the interpolation point. Note that the R/B signal represents whether the interpolation point is on an R or B pixel line, and the O/E signal represents whether the interpolation point is at a G pixel.

Similarly, the compensation value calculation unit 6A also parallel-calculates a plurality of interpolated pixel values corresponding to the position of the interpolation point using integrators (dividers) and adders. A corresponding interpolated pixel value is selected by a selector 61 based on the O/E signal representing the position of an actual interpolation point, and output as a pixel compensation value 7 (HF) at the interpolation point. As filter coefficients used to calculate a pixel compensation value, coefficients which are the sums of powers of 2 and the sum of which is a power of 2 are used. With this setting, the integrator (divider) used by the compensation value calculation unit 6A can be formed from a bit shift circuit, which greatly simplifies the circuit arrangement.

Figure 12:
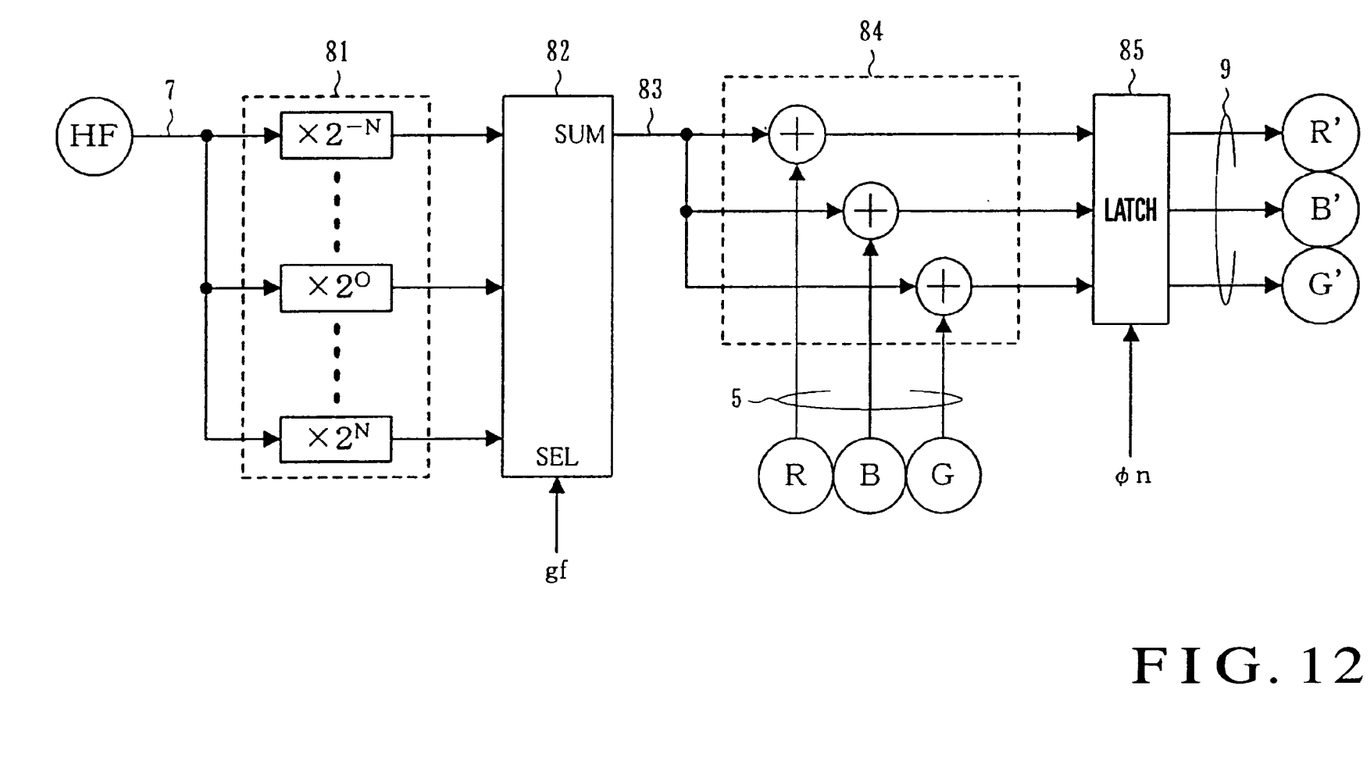
FIG. 12 is a block diagram showing an arrangement of a compensation unit.

FIG. 12 shows an arrangement of a compensation unit. In FIG. 12, reference numeral 81 denotes an integration unit made up of a plurality of integrators for integrating (dividing) the pixel compensation value 7 by a power value of 2. The respective integrators are parallel-connected. Reference numeral 82 denotes an adder for selectively adding at least one of outputs from the integrators of the integration unit 81 based on the compensation scale factor (weighting factor) gf.

Reference numeral 84 denotes an adder for individually adding an output 83 from the adder 82 to the interpolated pixel values 5 (R, B, and G), and outputting the sums as new pixel values 9 (R', B', and C') at the interpolation point that are compensated with the pixel compensation value 7; and 85, a latch for holding outputs from the adder 84 in synchronism with the interpolated pixel position in accordance with a clock φn whose period corresponds to the interval of the interpolated pixel position, and outputting the new pixel values 9 forming an image 1/n times the input image signal 1.

By arbitrarily selectively inputting the compensation scale factor gf, the interpolated pixel value 5 can be compensated by an intensity corresponding to gf. Since the integration unit 81 is constituted by a plurality of integrators for integrating power values of 2, an arbitrary compensation scale factor gf can be integrated to the pixel compensation value 7 with a simple circuit arrangement. If the reference level of the pixel compensation value 7 changes in accordance with the position of the interpolation point, gf can be automatically switched in accordance with positional information of the interpolation point to adjust the reference level of the pixel compensation value 7.

As described above, the third embodiment adopts the region value calculation unit 2. The region value calculation unit 2 calculates, as the region values 3 for respective pixel regions set in advance on the sub-matrix 22, the sums of the pixel values of pixels belonging to the respective pixel regions, and parallel-outputs the region values 3 in synchronism with reception of the pixel block 21. The interpolation unit 4A and compensation value calculation unit 6A selectively use the parallel-output region values, and sequentially calculate and output interpolated pixel values and a pixel compensation value at the interpolation point on the corresponding sub-matrix 22.

The sub-matrix shifts on the two-dimensional plane image of the image signal 1 in synchronism with reception of the pixel block 21. At the same time, a new interpolated pixel value compensated with the pixel compensation value 7 is attained as the interpolated pixel value of each color data at the interpolation point corresponding to the sub-matrix. The new interpolated pixel value is held and output in synchronism with an interpolated pixel selected from the input image signal 1 at an interval of n pixels in the pixel line direction and pixel column direction. This realizes pipeline processing synchronized with reception of the pixel block 21.

An interpolated pixel value for a higher image quality can be calculated at a higher speed, compared to a case wherein interpolation processing is done by numerical calculation using a DSP or the like. The third embodiment has been described based on the first embodiment. Even based on the second embodiment, the third embodiment can attain the same effects as those described above by constituting the circuit in correspondence with the numbers of pixel lines and pixel columns necessary for compensation value calculation processing.

When the third embodiment is applied to the second embodiment, the number of necessary pixels decreases, the number of latches for the buffer memory or delay decreases, and the necessary circuit area reduces. Especially, the decrease in the number of lines of data to be held in the buffer memory is very effective for an image sensing apparatus such as a recent digital still camera having a large number of pixels.

In the third embodiment, the latch 85 is connected to the output of the adder 84. The latch 85 holds and outputs the outputs from the adder 84 in synchronism with an interpolated pixel selected from the input image signal 1 at an interval of n pixels in the pixel line direction and pixel column direction. However, the present invention is not limited to this. For example, when a latch for holding and outputting region values A to F based on the clock φn may be connected to the output of the region value calculation unit 2 (see FIG. 10), the new pixel values 9 can be obtained at an interval of n pixels.

In this case, signals are output to circuits subsequent to the latch not every pixel but in units of n pixels. Thus, the processing operation speeds of these circuits can be set low, which reduces the power consumption. Theoretically, the power consumption amount can be reduced at maximum when latches are arranged at the input stages of the adders 201 to 207 of the region value calculation unit 2.

Figure 13:
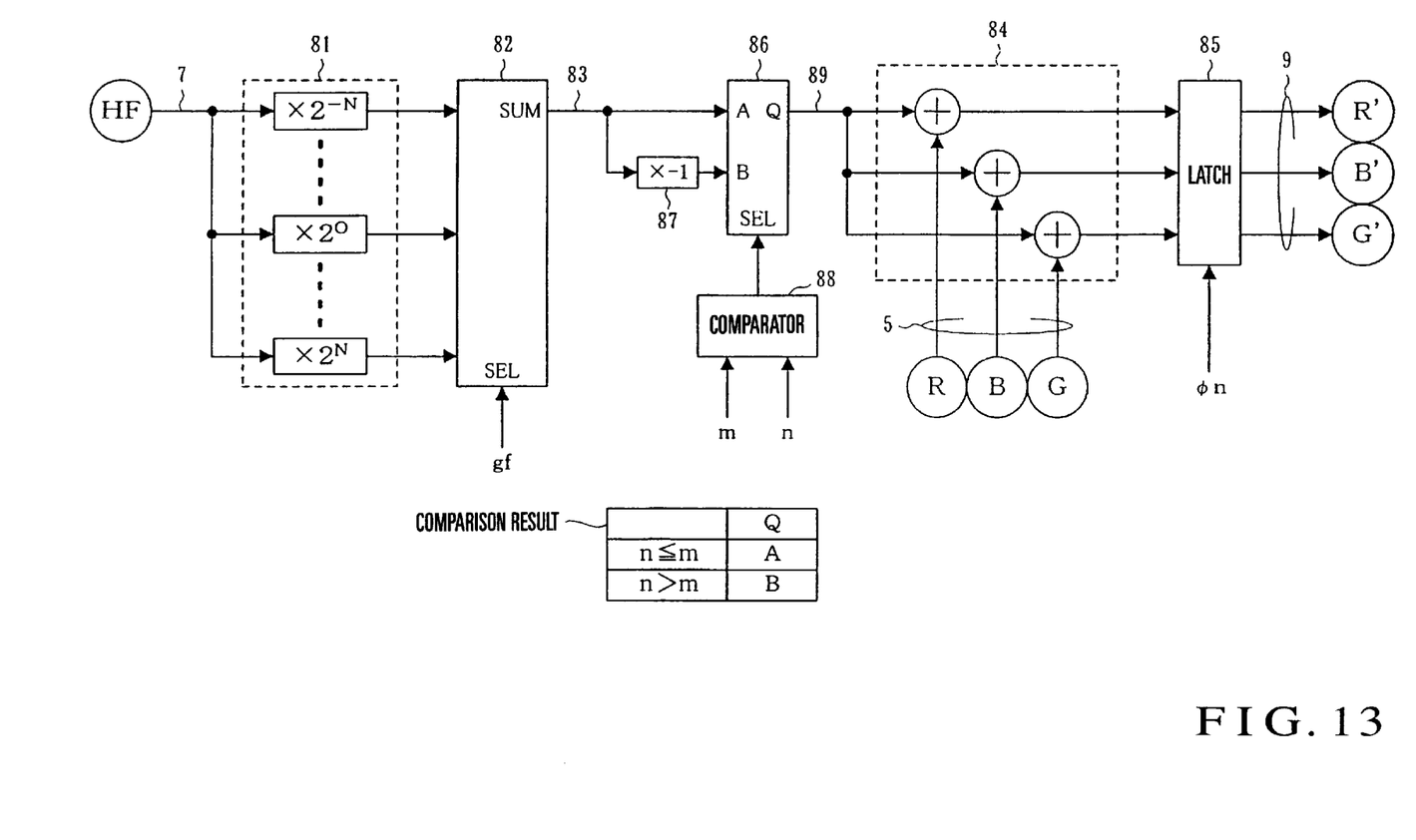
FIG. 13 is a block diagram showing an arrangement of a compensation unit according to the fourth embodiment.

The fourth embodiment of the present invention will be described with reference to FIG. 13.

In FIG. 2B, the interpolation region 12A of the interpolation point 11A and the interpolation region 12B of the interpolation point 11B are in contact with each other, and the pixel interval n between the interpolation points 11A and 11B is equal to the size m of the interpolation region 12A or 12B (n=m=3). If, however, the pixel interval n between interpolation points becomes large, and interpolation regions are apart from each other (n>m), some pixels are not used for interpolation processing by the interpolation unit 4.

Hence, for n>m, pixel values not used for interpolation processing are reflected on compensated pixel values by not adding but subtracting a compensation value. In FIG. 13, an inverter 87 for inverting the polarity of an output 83 from an adder 82, and a selector 86 for selecting either one of an output from the inverter 87 and the output 83 from the adder 82 are arranged between the adder 82 and an adder 84. The selector 86 is controlled based on the comparison result of a comparator 88 for comparing m and n.

When the comparator 88 determines n≦m, an input A to the selector 86 is selected and output as an output 89, and the output 83 from the adder 82 is directly input to the adder 84. Accordingly, for n≦m, the adder 84 adds a pixel compensation value 7 to an interpolated pixel value 5.

To the contrary, when the comparator 88 determines n>m, an input B to the selector 86 is selected as the output 89, and a signal prepared by inverting the output 83 from the adder 82 by the inverter 87 is output to the adder 84. As a result, for n>m, the adder 84 subtracts the pixel compensation value 7 from the interpolated pixel value 5. In this case, pixel coefficients used for compensation are positive values, so that the same effects as those when a low-pass filter is applied to a compensation region can be obtained.

If the size m of the interpolation region changes for each color data, a compensation unit 8 may compensate for the interpolated pixel value for each color data. For example, letting mx be the size of the interpolation region for each color data x (x={R, G, B}), the color data x can be compensated by $$x'=x+HF \text{ (for } n \leq mx)$$

$$x'=x-HF \text{ (for } n>mx)$$

If the size mx of the interpolation region is equal to the interval n of the interpolation points (mx=n) for a smaller number of pixels such as R or B pixels than that of G pixels on an original image, the compensation unit 8 does not compensate for the interpolated pixel value 5 using the pixel compensation value 7, but compensates for it at three stages:

$$x'=x$$

As has been described above, the present invention adopts an interpolation unit for interpolating, for an interpolation point selected from an image signal at an interval of n pixels in the pixel line direction and pixel column direction, the pixel value of each color data at the interpolation point using the pixel values of pixels of the same color falling within an interpolation region of m×m pixels (m is an integer of 2 or more) centered on the interpolation point, and outputting the pixel value as an interpolated pixel value at the interpolation point for each color data, and a compensation value calculation unit for generating a pixel compensation value for compensating for the pixel value of the interpolation point using the pixel values of a plurality of pixels falling within a compensation region of M×M pixels (M is an integer equal to or larger than m and n) centered on the interpolation point that is wider than and includes the interpolation region. The interpolated pixel value of each color data at the interpolation point that is output from the interpolation unit is compensated using the pixel compensation value corresponding to the interpolation point that is obtained by the interpolation unit. The compensated pixel value is output as a new pixel value of each color data at the interpolation point. Interpolation processing using the pixels of the interpolation region and filter calculation processing for suppressing degradation of image quality caused by downsizing of an image can be executed at once. Unlike the prior art, an intermediate image having all color data for each pixel of an original image need not be generated. A downsized image having all color data for each pixel can be displayed at high speed with high image quality without requiring high power consumption.

What is claimed is:

1. An image processing apparatus for generating, from an image signal, a new image signal having pixel values of all required color data for each interpolation point set on a two-dimensional plane 1/n (n is an integer of not less than 2) times the image signal, comprising:

an interpolation unit for interpolating a pixel value of each color data at an interpolation point using pixel values of pixels of the same color falling within an interpolation region of m×m pixels (m is an integer of not less than 2) centered on the interpolation point, for an interpolation point selected at an interval of n pixels (n is an integer of not less than 2) in at least a pixel line direction or a pixel column direction from an original image signal which has only a pixel value of single predetermined color data and is obtained by an image sensing element made up of many pixels that are arrayed in a matrix on a two-dimensional plane and respectively have different color filters, and for outputting the pixel value as an interpolated pixel value at the interpolation point for each color data;

a compensation value calculation unit for generating a pixel compensation value for compensating for the pixel value of the interpolation point using pixel values of a plurality of pixels falling within a compensation region of M×M pixels (M is an integer not less than m and n) centered on the interpolation point that is wider than and includes the interpolation region; and a compensation unit for compensating for the interpolated pixel value of each color data at the interpolation point that is output from said interpolation unit by using the pixel compensation value corresponding to the interpolation point that is obtained by said compensation value calculation unit, and outputting the compensated pixel value as a new pixel value of each color data at the interpolation point.

2. An apparatus according to claim 1, wherein when the interval n of the interpolation point is not larger than a size m of the interpolation region, said compensation unit adds the pixel compensation value to the interpolated pixel value to calculate a new pixel value at the interpolation point.

3. An apparatus according to claim 1, wherein when the interval n of the interpolation point is larger than a size m of the interpolation region, said compensation unit subtracts the pixel compensation value from the interpolated pixel value to calculate a new pixel value at the interpolation point.

4. An apparatus according to claim 1, wherein said compensation value calculation unit calculates a pixel compensation value corresponding to the interpolation point using only pixel values of a plurality of pixels having color data which represent luminance components of the image signal.

5. An apparatus according to claim 1, wherein said interpolation unit sequentially receives pixel values as pixel blocks from the image signal by M pixel lines in parallel with each other in units of single pixel columns, uses pixel values of pixels contained in a compensation region made up of M successively received pixel blocks, and sequentially calculates an interpolated pixel value at an interpolation point in the interpolation region, and said compensation value calculation unit sequentially calculates and outputs a pixel compensation value for compensating for a pixel value of the interpolation point in the compensation region using pixel values of pixels contained in the same compensation region as the interpolation region used to calculate the interpolated pixel value in said interpolation unit.

6. An apparatus according to claim 1, wherein said apparatus further comprises a region value calculation unit for sequentially receiving pixel values forming the image signal as pixel blocks by M pixel lines in parallel with each other in units of single pixel columns, constituting a compensation region by M successively received pixel blocks, calculating sums of pixel values of pixels belonging to respective regions set in advance in the compensation region as region values of the respective regions, and parallel-outputting the region values in synchronism with reception of the pixel block, said interpolation unit selectively uses the region values parallel-output from said region value calculation unit, and sequentially calculates and outputs an interpolated pixel value at an interpolation point in a corresponding compensation region, and said compensation value calculation unit selectively uses the region values parallel-output from said region value calculation unit, and sequentially calculates and outputs a pixel compensation value for compensating for a pixel value of the interpolation point in the corresponding compensation region.

7. An apparatus according to claim 1, wherein said interpolation unit calculates an interpolated pixel value at an interpolation point from a sum of products of pixel values of pixels used in interpolation calculation and coefficients corresponding to the pixels, and uses, as the coefficients, coefficients which are sums of powers of 2 and the sum of which is a power of 2.

8. An apparatus according to claim 1, wherein said compensation value calculation unit calculates a compensation value from a sum of products of pixel values of pixels used in compensation value calculation and coefficients corresponding to the pixels, and uses, as the coefficients, coefficients which are sums of powers of 2 and the sum of which is a power of 2.

* * * * *